US010338750B2

(12) United States Patent
Ota

(10) Patent No.: US 10,338,750 B2
(45) Date of Patent: Jul. 2, 2019

(54) DISPLAY APPARATUS, PROJECTOR, AND DISPLAY CONTROL METHOD

(71) Applicant: Seiko Epson Corporation, Tokyo (JP)

(72) Inventor: Koichiro Ota, Omachi (JP)

(73) Assignee: Seiko Epson Corporation, Tokyo (JP)

(*) Notice: Subject to any disclaimer, the term of this patent is extended or adjusted under 35 U.S.C. 154(b) by 98 days.

(21) Appl. No.: 15/128,247

(22) PCT Filed: Mar. 23, 2015

(86) PCT No.: PCT/JP2015/001620
§ 371 (c)(1),
(2) Date: Sep. 22, 2016

(87) PCT Pub. No.: WO2015/146129
PCT Pub. Date: Oct. 1, 2015

(65) Prior Publication Data
US 2017/0097737 A1 Apr. 6, 2017

(30) Foreign Application Priority Data

Mar. 25, 2014 (JP) ................................. 2014-061792

(51) Int. Cl.
G06F 3/042 (2006.01)
G09G 5/00 (2006.01)
(Continued)

(52) U.S. Cl.
CPC ........ *G06F 3/0425* (2013.01); *G06F 3/03545* (2013.01); *G06F 3/0481* (2013.01);
(Continued)

(58) Field of Classification Search
CPC .. G06F 3/03545; G06F 3/038; G06F 3/04883; G06F 2203/04807; G06F 3/0416;
(Continued)

(56) References Cited

U.S. PATENT DOCUMENTS 6,842,175 B1* 1/2005 Schmalstieg ........... G06F 3/011
345/427
8,788,950 B2 7/2014 Ivashin et al.
(Continued)

FOREIGN PATENT DOCUMENTS

EP 2637098 A 9/2013
JP 2010-097522 A 4/2010
(Continued)

OTHER PUBLICATIONS

Extended European Search Report received in European Patent Application No. 15768844.1, dated Aug. 14, 2017.
(Continued)

Primary Examiner — Sanjiv D. Patel
(74) Attorney, Agent, or Firm — ALG Intellectual Property, LLC

(57) ABSTRACT

A display apparatus includes a first detection section detects the position of a first indicator on the image. A second detection section detects the position of a second indicator on the image. A storage section includes a first storage region corresponding to the first indicator and a second storage region corresponding to the second indicator. The first storage control section stores a first virtual object relating to the first indicator in the first storage region. The second storage control section stores a second virtual object relating to the second indicator in the second storage region. A first pasting section pastes the first virtual object stored in the first storage region to the image according to an operation of the first indicator. A second pasting section pastes the second virtual object stored in the second storage region to the image according to an operation of the second indicator.

10 Claims, 4 Drawing Sheets

(51) Int. Cl.
*G09G 5/377* (2006.01)
*G09G 5/38* (2006.01)
*G06F 3/0481* (2013.01)
*G06T 7/70* (2017.01)
*G06F 3/0354* (2013.01)
*G06F 3/0484* (2013.01)
*H04N 9/31* (2006.01)

(52) U.S. Cl.
CPC ...... *G06F 3/04842* (2013.01); *G06F 3/04845* (2013.01); *G06T 7/70* (2017.01); *G09G 5/00* (2013.01); *G09G 5/377* (2013.01); *G09G 5/38* (2013.01); *H04N 9/3179* (2013.01); *G09G 2340/0464* (2013.01); *G09G 2340/12* (2013.01)

(58) Field of Classification Search
CPC ............... G06F 3/03542; G06F 3/0386; G06F 2203/04104; G06F 3/0412; G06F 9/543; G06F 3/0481; G06F 3/011; G06F 3/017; G06F 3/04842; G06F 3/0488; G06F 3/041–048; H04N 7/15; H04L 67/10; H04L 41/22
See application file for complete search history.

(56) References Cited

U.S. PATENT DOCUMENTS

| | | | | |
|---|---|---|---|---|
| 8,964,947 | B1* | 2/2015 | Noolu | H04M 3/541 379/88.01 |
| 9,417,933 | B2* | 8/2016 | Narayanan | G06F 9/543 |
| 2003/0122749 | A1* | 7/2003 | Booth, Jr. | G09G 3/3208 345/82 |
| 2004/0119763 | A1* | 6/2004 | Mizobuchi | G06F 3/04883 715/863 |
| 2007/0079249 | A1* | 4/2007 | Pall | G06F 9/543 715/758 |
| 2008/0088607 | A1 | 4/2008 | Sandstrom et al. | |
| 2011/0029855 | A1 | 2/2011 | Morita | |
| 2011/0126092 | A1* | 5/2011 | Harris | G06F 17/243 715/256 |
| 2011/0202971 | A1* | 8/2011 | Margolin | G06F 9/543 726/3 |
| 2013/0300658 | A1 | 11/2013 | Endo et al. | |
| 2014/0149880 | A1* | 5/2014 | Farouki | H04L 12/1822 715/748 |
| 2014/0253470 | A1* | 9/2014 | Havilio | G06F 3/0412 345/173 |
| 2014/0365978 | A1* | 12/2014 | Fish | G06F 3/017 715/863 |

FOREIGN PATENT DOCUMENTS

| | | |
|---|---|---|
| JP | 2011-028621 A | 2/2011 |
| JP | 2011-054096 A | 3/2011 |
| JP | 2012-252652 A | 12/2012 |
| JP | 2013-125488 A | 6/2013 |
| JP | 2013-168142 A | 8/2013 |
| JP | 2013-235416 A | 11/2013 |

OTHER PUBLICATIONS

Search Report recieved in International Application No. PCT/JP2015/001620, dated Apr. 14, 2015.

* cited by examiner

DISPLAY APPARATUS, PROJECTOR, AND DISPLAY CONTROL METHOD

CROSS-REFERENCE TO RELATED APPLICATIONS

This application is the U.S. National Phase under 35 U.S.C. § 371 of International Application No. PCT/JP2015/001620 filed on Mar. 23, 2015, which in turn claims the benefit of Japanese Application No. 2014-061792 filed on Mar. 25, 2014, the disclosures of which are expressly incorporated by reference herein.

BACKGROUND

1. Technical Field

The present invention relates to a display apparatus that displays an image according to a position indicated by an indicator, a projector, and a display control method.

2. Related Art

In a display apparatus such as a projector, a technique that detects the position of an electronic pen (indicator) on a screen and projects an image (handwritten image) according to a path of the electronic pen is known. The function is referred to as an electronic blackboard function or an electronic whiteboard function. In a projector having the electronic blackboard function, a screen is divided into plural regions using the fact that the size of the screen is large, and a handwritten image is independently drawn in each region using plural electronic pens (for example, see JP-2013-168142 and JP-2013-235416).

SUMMARY

In an electronic blackboard system, cut and paste, and copy and paste widespread in personal computers may be used. However, in the techniques described in PTLs 1 and 2, after cutting a virtual object by a first indicator and before pasting the cut virtual object, when cutting another virtual object by a second indicator, data on the other virtual object is stored in a storage region called a clip buffer, and then, if paste is instructed by the first indicator, the other virtual object is pasted, which is problematic.

On the contrary, the invention provides a technique that improves the convenience of a function of cut and paste or copy and paste in a display apparatus that displays an image according to positions of plural indicators.

The invention provides a display apparatus including: display section that displays an image; first detection section that detects the position of a first indicator on the image; second detection section that detects the position of a second indicator on the image; storage section that includes a first storage region corresponding to the first indicator and a second storage region corresponding to the second indicator; first storage control section that stores a first virtual object relating to the first indicator in the first storage region; second storage control section that stores a second virtual object relating to the second indicator in the second storage region; first pasting section that pastes the first virtual object stored in the first storage region to the image according to an operation of the first indicator; and second pasting section that pastes the second virtual object stored in the second storage region to the image according to an operation of the second indicator.

According to this display apparatus, it is possible to independently perform cut and paste or copy and paste with respect to the first indicator and the second indicator, respectively.

In the display apparatus, the storage section may include a third storage region common to the first indicator and the second indicator, switching section that switches operation modes of the first storage control section and the second storage control section to any one of a plurality of operation modes including a first mode and a second mode may be further provided, the first storage control section may store the first virtual object in the first storage region in the first mode, and may store the first virtual object in the third storage region in the second mode, and the second storage control section may store the second virtual object in the second storage region in the first mode, and may store the second virtual object in the third storage region in the second mode.

According to this display apparatus, it is possible to perform switching between a mode that independently performs cut and paste or copy and paste with respect to the first indicator and the second indicator, respectively, and a mode that performs cut and paste or copy and paste common to the first indicator and the second indicator.

The first storage region may be used as the third storage region.

According to this display apparatus, compared with a case where the third storage region is provided in addition to the first storage region and the second storage region, the storage region can be saved.

When at least one of the first indicator and the second indicator is a user's finger, the switching section may switch the operation mode to the second mode.

According to this display apparatus, when the user's finger is used, it is possible to switch the operation mode to a mode where cut and paste or copy and paste is commonly performed with respect to the first indicator and the second indicator.

In the display apparatus, the first virtual object may be a virtual object of which copy is instructed using the first indicator.

According to this display apparatus, it is possible to perform copy and paste with respect to the virtual object indicated by the first indicator.

The first virtual object may be a virtual object that is drawn using the first indictor.

According to this display apparatus, it is possible to perform cut and paste or copy and paste with respect to the virtual object that is drawn by the first indicator.

The first virtual object may be a virtual object that is selected using the first indictor.

According to this display apparatus, it is possible to perform cut and paste or copy and paste with respect to the virtual object that is selected by the first indicator.

In addition, the invention provides a projector including: projection section that projects an image; first detection section that detects the position of a first indicator on the image; second detection section that detects the position of a second indicator on the image; storage section that includes a first storage region corresponding to the first indicator and a second storage region corresponding to the second indicator; first storage control section that stores a first virtual object relating to the first indicator in the first storage region; second storage control section that stores a second virtual object relating to the second indicator in the second storage region; first pasting section that pastes the first virtual object stored in the first storage region to the image according to an operation of the first indicator; and second pasting section that pastes the second virtual object stored in the second storage region to the image according to an operation of the second indicator.

According to this projector, it is possible to independently perform cut and paste or copy and paste with respect to the first indicator and the second indicator, respectively.

Furthermore, the invention provides a display control method in a display apparatus including display section that displays an image, and storage section that includes a first storage region corresponding to a first indicator and a second storage region corresponding to a second indicator, the method including: detecting the position of the first indicator on the image; detecting the position of the second indicator on the image; storing a first virtual object relating to the first indicator in the first storage region; storing a second virtual object relating to the second indicator in the second storage region; pasting the first virtual object stored in the first storage region to the image according to an operation of the first indicator; and pasting the second virtual object stored in the second storage region to the image according to an operation of the second indicator.

According to this display control method, it is possible to independently perform cut and paste or copy and paste with respect to the first indictor and the second indicator, respectively.

DESCRIPTION OF EXEMPLARY EMBODIMENTS

1. Configuration

Figure 1:
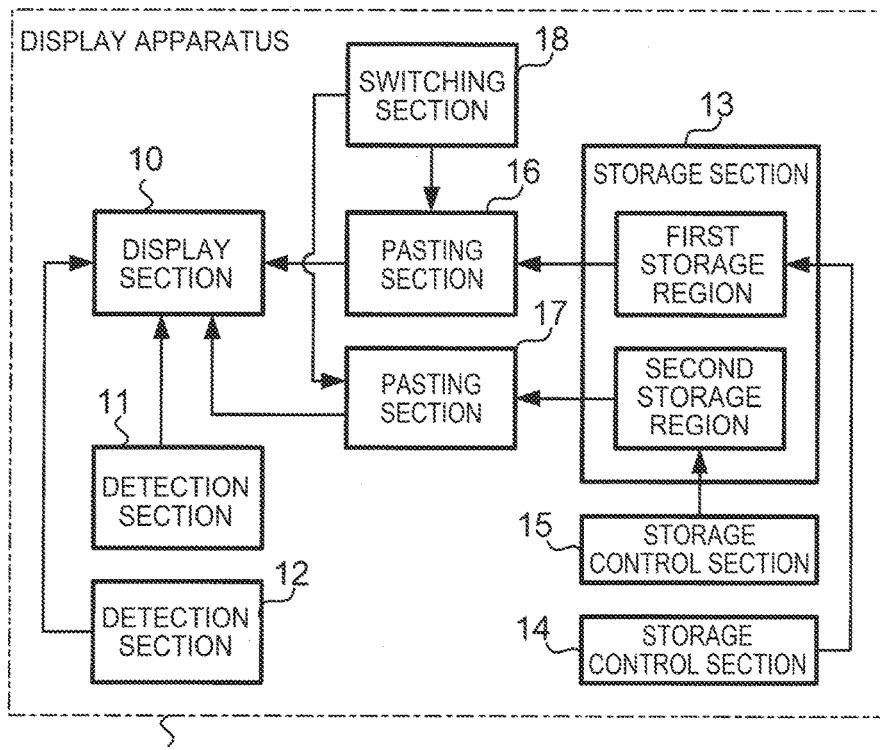
FIG. 1 is a diagram illustrating a functional configuration of a display apparatus 1 according to an embodiment.

FIG. 1 is a diagram illustrating a functional configuration of a display apparatus 1 according to an embodiment. The display apparatus 1 is a device that displays an image according to a path of an indicator (for example, an electronic pen). The display apparatus 1 has a function of independently detecting paths of two indicators, that is, a first indicator and a second indicator.

The display apparatus 1 includes display section 10, detection section 11, detection section 12, storage section 13, storage control section 14, storage control section 15, pasting section 16, pasting section 17, and switching section 18. The display section 10 displays an image according to supplied image data. The detection section 11 detects the position of the first indicator. The detection section 12 detects the position of the second indicator. The storage section 13 stores virtual objects relating to the first indictor and the second indicator. Specifically, the storage section 13 includes a first storage region and a second storage region. The storage section 13 includes the first storage region corresponding to the first indicator, and the second storage region corresponding to the second indicator. The storage control section 14 stores a first virtual object in the first storage region. The storage control section 15 stores a second virtual object in the second storage region. The first virtual object and the second virtual object are virtual objects relating to the first indictor and the second indicator, respectively. The virtual object refers to a virtual object indicated by data, for example, an image, a line drawing, a figure, an icon, and a character string. The pasting section 16 pastes the first virtual object stored in the first storage region to an image displayed in the display section 10 according to an operation of the first indicator. The pasting section 17 pastes the second virtual object stored in the second storage region to an image displayed in the display section 10 according to an operation of the second indicator.

In this example, the storage section 13 includes a third storage region. The switching section 18 switches operation modes of the storage control section 14 and the storage control section 15 to any one of plural operation modes including a first mode and a second mode. The storage control section 14 stores the first virtual object in the first storage region in the first mode, and stores the first virtual object in the third storage region in the second mode.

Figure 2:
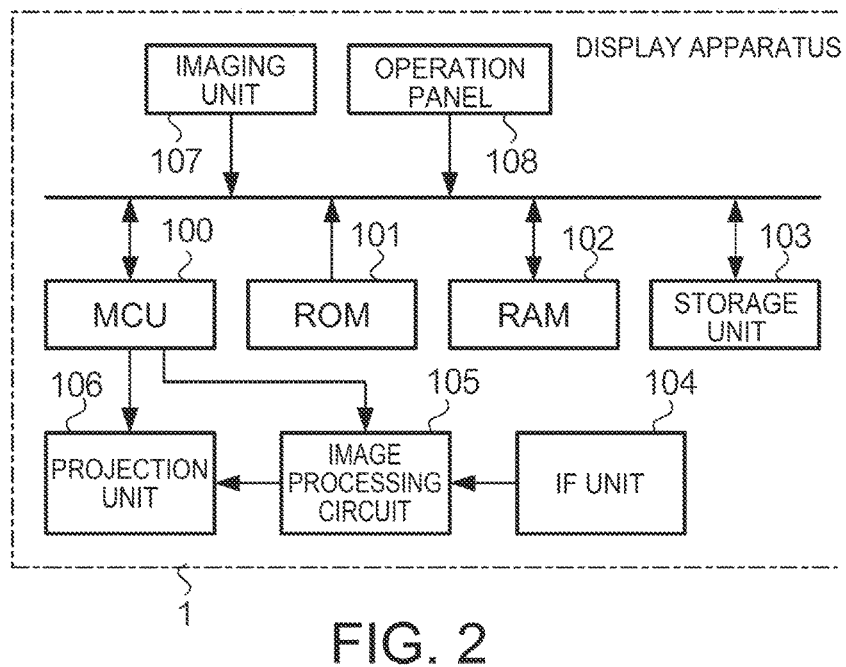
FIG. 2 is a diagram illustrating a hardware configuration of the display apparatus 1 according to the embodiment.

FIG. 2 is a diagram illustrating a hardware configuration of the display apparatus 1 according to the embodiment. In this example, the display apparatus 1 is a projector having a so-called whiteboard function (which may also be referred to as an electronic blackboard function or an interactive function). As an indicator in the whiteboard function, an electronic pen 2 and an electronic pen 3 are used.

The display apparatus 1 includes an MCU (Micro Control Unit) 100, a ROM (Read Only Memory) 101, a RAM (Random. Access Memory) 102, a storage unit 103, an IF (interface) unit 104, an image processing circuit 105, a projection unit 106, an imaging unit 107, and an operation panel 108.

The MCU 100 is a control device that controls respective units of the display apparatus 1. The ROM 101 is a non-volatile storage device that stores various programs and data. The RAM 102 is a volatile storage device that stores data, and functions as a work area when the MCU 100 executes processing. The storage unit 103 is a non-volatile storage device that stores data and programs, which is an HDD (Hard Disk Drive) or an SSD (Solid State Drive), for example. In this example, the storage unit 103 stores a program (hereinafter, referred to as a "whiteboard program") that causes the display apparatus 1 to realize a whiteboard function.

The IF unit 104 is an interface that mediates in signal or data communication with an external device which is a video source. The IF unit 104 includes a terminal (for example, VGA terminal, USB terminal, wired LAN interface, S terminal, RCA terminal, HDMI (High-Definition Multimedia Interface: registered trademark) terminal, or the like) for the signal or data communication with the external device, and a wireless LAN interface.

The image processing circuit 105 performs predetermined image processing for a video signal input thereto (hereinafter referred to as an "input video signal"). The projection unit 106 projects an image onto a screen according to a video signal subjected to the image processing. The projection unit 106 includes a light source, a light modulator, an optical system, and a drive circuit thereof (all not shown). The light source is a lamp such as a high pressure mercury lamp, a halogen lamp or a metal halide lamp, or a solid light source such as an LED (Light Emitting Diode) or a laser diode. The light modulator is a device that modulates a light beam emitted from the light source according to the video signal, and for example, includes a liquid crystal panel. The optical system is an element that projects the light beam modulated by the light modulator onto the screen, and for example, includes a lens and a prism. In this example, a light source and a light modulator are provided for each color component. Specifically, a light source and a light modulator are individually provided with respect to each of three primary colors of red, green, and blue. The light beams modulated by the respective liquid crystal panels are synthesized by the optical system, and are then projected onto the screen.

The imaging unit 107 images a region including the screen where the image is projected in order to specify the positions of the electronic pen 2 and the electronic pen 3. In this example, the electronic pen 2 and the electronic pen 3 respectively have a light emitting element that outputs a light beam having a specific wavelength and a pressure sensor provided in a pen tip, in which if the pressure sensor detects a pressure, the light emitting element outputs the light beam. The MCU 100 detects the positions of the electronic pen 2 and the electronic pen 3 from the positions of points corresponding to the light beams of the wavelengths in the images captured by the imaging unit 107. The imaging unit 107 images the region including the screen at a predetermined cycle. If the detected positions are time-serially arranged, the paths of the electronic pens are obtained. The MCU 100 controls the image processing circuit 105 and the projection unit 106 to draw an image according to the positions (path) of the detected electronic pen 2 and an image according to the positions (path) of the electronic pen 3.

The operation panel 108 is an input device through which a user inputs an instruction to the display apparatus 1, and for example, includes a keypad, buttons, or a touch panel.

In this example, the projection unit 106 is an example of the display section 10, and also is an example of the projection section. The imaging unit 107 and the MCU 100 are examples of the detection section 11 and the detection section 12. The RAM 102 is an example of the storage section 13. The MCU 100 that executes the whiteboard program is an example of the storage control section 14, the storage control section 15, the pasting section 16, the pasting section 17, and the switching section 18.

2. Problems of Related Art Technique

Before describing the present embodiment, problems of a related art technique will be described.

Figure 3:
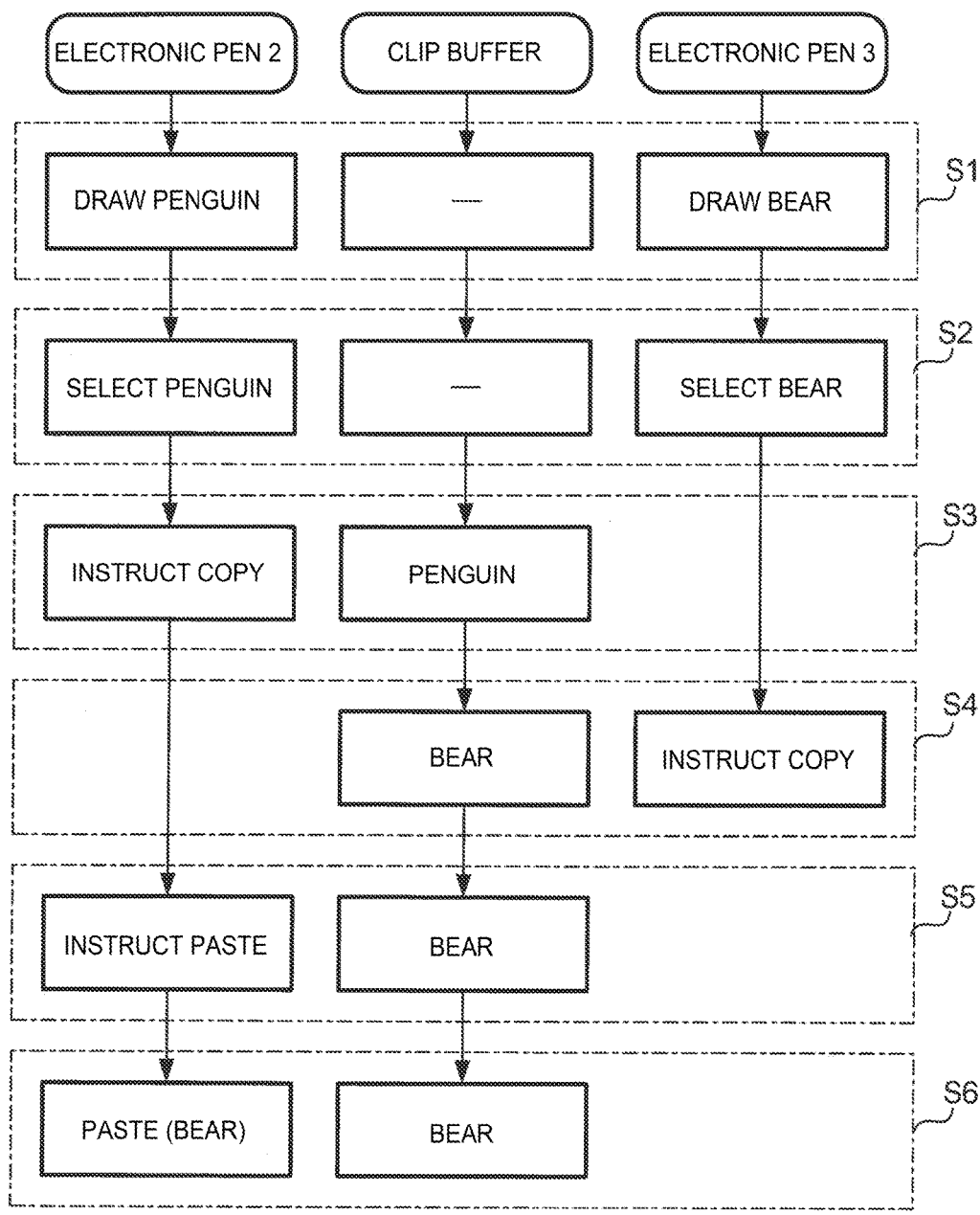
FIG. 3 is a flowchart illustrating an operation of a display apparatus 1 according to a related art technique.

FIG. 3 is a flowchart illustrating an operation of a display apparatus 1 according to a related art technique. In this example, the display apparatus 1 includes a clip buffer common to an electronic pen 2 and an electronic pen 3. The clip buffer is a storage region that stores a virtual object (data) to perform processing for a selected virtual object (for example, cut, copy, paste, grouping, grouping cancel, delete, or the like). This storage region is provided in a RAM 102. In the following description, software such as a whiteboard program may be described as a subject of an operation, but this means that the MCU 100 that executes the software performs processing in cooperation with other hardware elements.

In this example, a total of two users of a user A who uses the electronic pen 2 and a user B who uses the electronic pen 3 draw images using the whiteboard function of the display apparatus 1. In FIG. 3, operations of the electronic pen 2 and the electronic pen 3, and virtual objects stored in the clip buffer are shown. At a starting point of the flow in FIG. 3, nothing is stored in the clip buffer. It should be noted that, in this example, only a single virtual object is stored in the clip buffer.

In step S1, the user A draws a picture of a penguin. Further, the user B draws a picture of a bear.

In step S2, the user A selects the picture of the penguin drawn by the user A. The user B selects the picture of the bear. The electronic pen 2 and the electronic pen 3 have a button for instructing selection of a virtual object. Here, if the user touches the virtual object while pressing the button, or if the user draws a figure that surrounds the virtual object, the virtual object is selected. If the virtual object is selected, the whiteboard program displays a menu including processing items capable of being executed with respect to the selected virtual object.

Figure 4:
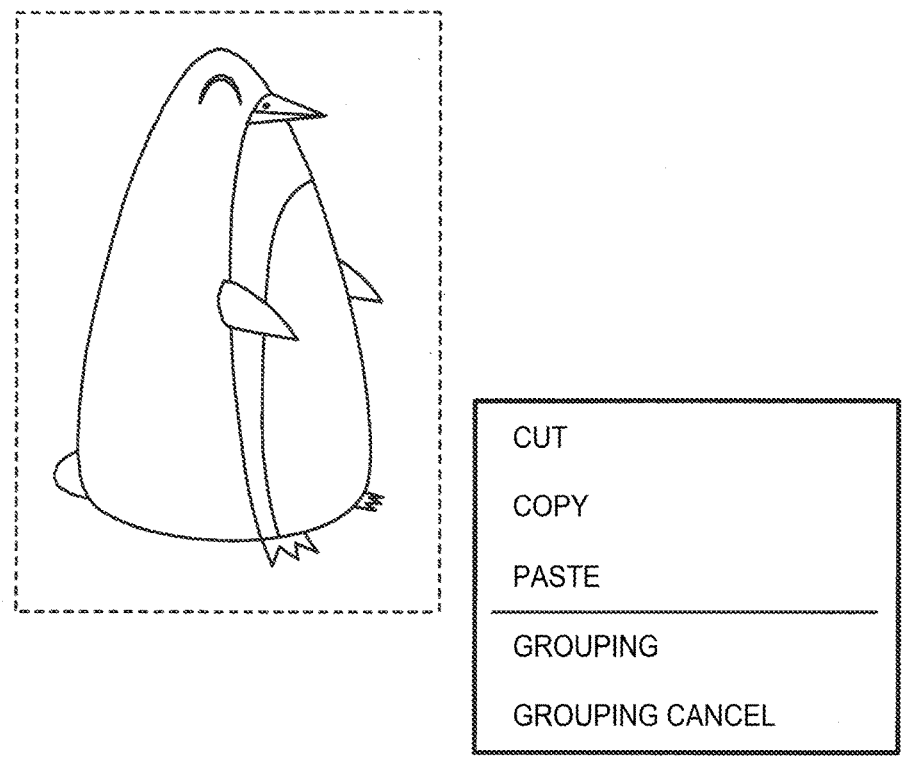
FIG. 4 is a diagram illustrating a processing menu.

FIG. 4 is a diagram illustrating a processing menu. In this example, processing of cut, copy, paste, grouping, grouping cancel, and delete may be executed with respect to the selected virtual object. The whiteboard program executes processing corresponding to an item selected therefrom by the user.

Referring to FIG. 3 again, in step S3, the user A copies the selected virtual object (in this example, the picture of the penguin) into the clip buffer. That is, the user A selects the "copy" item from the menu in FIG. 4. Here, the user B does not perform an operation on the menu. The picture of the penguin is stored in the clip buffer.

In step S4, the user B copies the selected virtual object (in this example, the picture of the bear) into the clip buffer. That is, the user B selects the "copy" item from the menu in FIG. 4. Here, the user A does not perform any operation. The picture of the bear is stored in the clip buffer. Here, the picture of the penguin stored up to now is deleted.

In step S5, the user A gives an instruction to paste the virtual object onto a screen. For example, if the user A touches the screen using the electronic pen 2 while pressing the button of the electronic pen 2, the whiteboard program displays the menu including the "paste" item. If the user A selects the "paste" item from the menu, paste is indicated.

In step S6, the whiteboard program pastes (attaches) the virtual object stored in the clip buffer, which is the picture of the bear in this example, at a designated position on the screen.

Here, which virtual object the user A desires to paste varies depending on circumstances. For example, when the user A is aware of the copy of the picture of the bear by the user B, it may be considered that the user A has an intention to paste the picture of the bear. However, when the user A is not aware of the copy of the picture of the bear by the user B, it may be considered that the user A has an intention to paste the picture of the penguin. In this case, there is a problem in that the picture of the bear is pasted contrary to the intention of the user A. The present embodiment solves such a problem.

3. Operation

3-1. Operation Example 1

Figure 5:
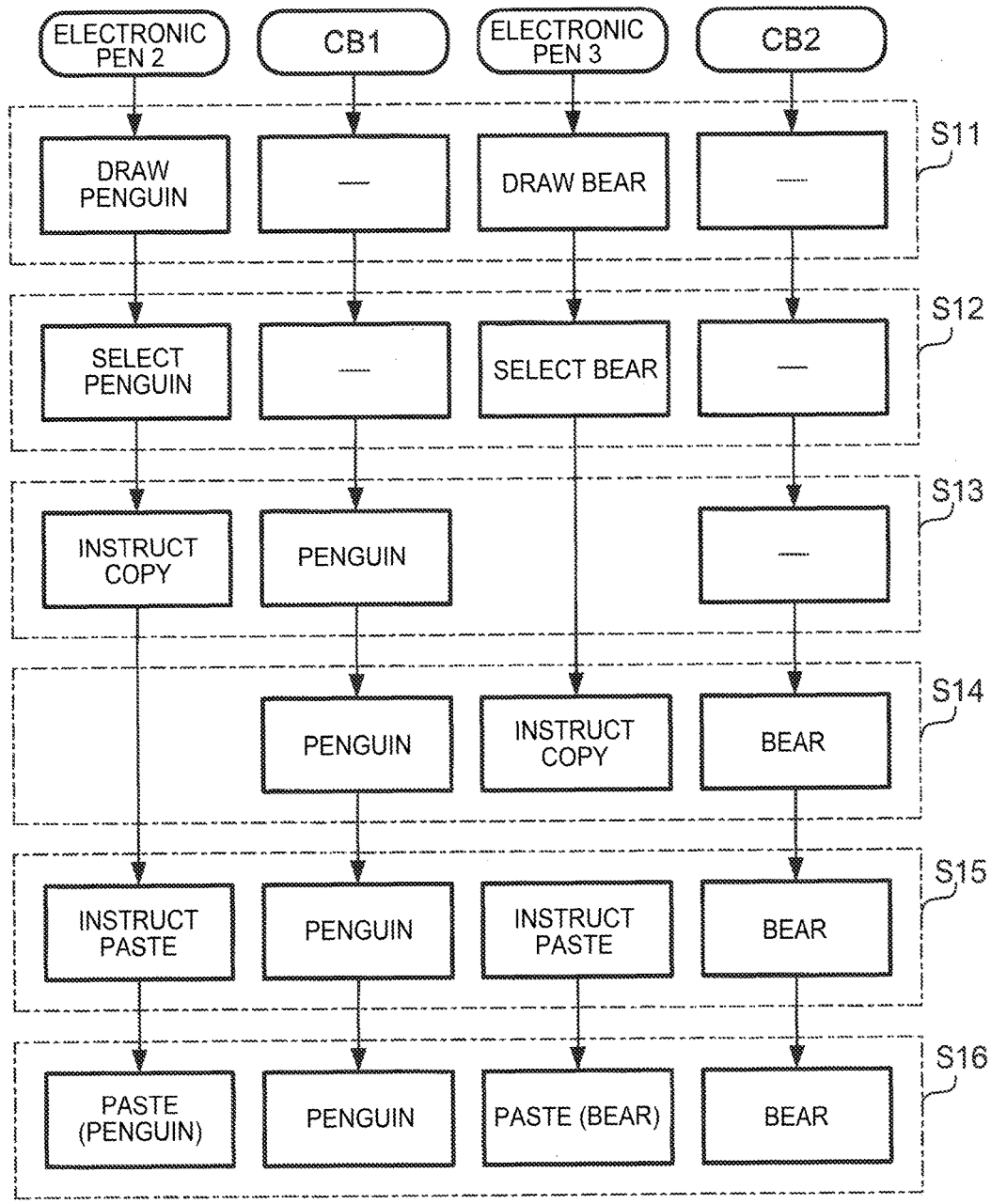
FIG. 5 is a flowchart illustrating an operation of the display apparatus 1 according to the embodiment.

FIG. 5 is a flowchart illustrating an operation of the display apparatus 1 according to the embodiment. In this example, the display apparatus 1 includes two clip buffers of a clip buffer CB1 corresponding to an electronic pen 2 and a clip buffer CB2 corresponding to an electronic pen 3.

In step S11, a user A draws a picture of a penguin. Further, a user B draws a picture of a bear. In step S12, the user A selects the picture of the penguin drawn by the user A. The user B selects the picture of the bear.

In step S13, the user A copies the selected virtual object (in this example, the picture of the penguin) into the clip buffer. That is, the user A selects the "copy" item from the menu in FIG. 4. Here, the user B does not perform an operation on the menu. The virtual object (the picture of the penguin) selected by the user A is stored in the clip buffer CB1.

In step S14, the user B copies the selected virtual object (in this example, the picture of the bear) into the clip buffer. That is, the user B selects the "copy" item from the menu in FIG. 4. The virtual object (the picture of the bear) selected by the user B is stored in the clip buffer CB2.

In step S15, the user A gives an instruction to paste the virtual object onto the screen. Further, the user B also gives an instruction to paste the virtual object onto the screen.

In step S16, the whiteboard program pastes the virtual objects. That is, the whiteboard program pastes the virtual object stored in the clip buffer CB1, which is the picture of the penguin in this example, at a position indicated by the electronic pen 2, and pastes the virtual object stored in the clip buffer CB2, which is the picture of the bear in this example, at a position indicated by the electronic pen 3.

3-2. Operation Example 2

In operation example 1, an example in which each of two users uses one electronic pen is described, but one user may use two electronic pens. In this case, assuming that the processing is performed as shown in FIG. 5, whether a virtual object to be pasted by a user in step S15 is the virtual object stored in the clip buffer CB1 or the virtual object stored in the clip buffer CB2 varies depending on circumstances. Thus, in operation example 2, the display apparatus 1 includes two operation modes of a sharing mode and an independent mode. The sharing mode is an operation mode where a single clip buffer is shared by two electronic pens. The independent mode is an operation mode where a specific clip buffer is provided for each electronic pen.

For example, icons for summoning a screen for performing a variety of setting changes are displayed on the screen displayed by the display apparatus 1. As the user touches an icon with an electronic pen, a menu corresponding thereto may be summoned. The menu includes an item for performing switching of the operation mode.

In this case, the clip buffer shared by two electronic pens may be provided as a third clip buffer different from the clip buffers (clip buffers CB1 and CB2) specific to the respective electronic pens, or any one of the clip buffers CB1 and CB2 may be used as the clip buffer for sharing.

3-3. Operation Example 3

In operation example 2, an example in which the user changes the setting from the menu screen to switch the operation mode is described, but the whiteboard program may automatically switch the operation mode. In this example, the whiteboard program switches the operation mode according to whether a used indicator is an electronic pen or a finger of a user. Specifically, when the finger is used as the indicator, the operation mode is switched to the sharing mode, and when the electronic pen is used as the indicator, the operation mode is switched to the independent mode. According to this operation example, the user may intuitively switch the operation mode regardless of the menu operation.

It should be noted that, in this case, the whiteboard program has a function of recognizing the shape of a user's hand from the image captured by the imaging unit 107. When the user's hand has a specific shape (for example, a shape in which a forefinger is raised), the whiteboard program recognizes the hand as the indicator, and the position of the forefinger as the position indicated by the indicator.

4. Modification Examples

The invention is not limited to the above-described embodiment, and various modifications may be made. Hereinafter, some modification examples will be described. In the following modification examples, two or more may be combined.

The storage of the virtual object in the clip buffer corresponding to a specific indicator, that is, the relationship between the indicator and the virtual object is not limited to the examples described in the embodiment. In the embodiment, the whiteboard program stores the virtual object in the clip buffer corresponding to the indicator that instructs the copy of the virtual object. However, the whiteboard program may store the virtual object in the clip buffer corresponding to the indicator that draws the virtual object. For example, when the picture of the penguin drawn by the electronic pen 2 is selected by the electronic pen 3, the picture of the penguin may be stored in the clip buffer CB1 corresponding to the electronic pen 2. In another example, the whiteboard program may store the virtual object in the clip buffer corresponding to the indicator that selects the virtual object.

When the finger is used as the indicator, the whiteboard program may provide a finger clip buffer. In this case, similar to the case where two electronic pens are used, an electronic pen clip buffer and a finger clip buffer are separately used.

The capacity of the clip buffer is not limited to a capacity corresponding to one virtual object. The clip buffer may store plural virtual objects.

The hardware for realizing the functions in FIG. 1 is not limited to the example shown in FIG. 2. For example, the display apparatus 1 may not include the imaging unit 107. In this case, the electronic pen may detect its own position, and may notify the display apparatus 1 of the detected position. Further, the projection unit 106 may not include the light modulator for each color component, and may include a single light modulator. Further, an electric optical element other than a liquid crystal panel, such as a digital mirror drive (DMD), may be used as the light modulator. In addition, the display apparatus 1 is not limited to the projector, and may be a direct-view display apparatus.

A part of the functions in FIG. 1 may be omitted. For example, the display apparatus 1 may not include the switching section 18.

The invention claimed is:
1. A display apparatus comprising:
a display section that displays an image;
a first detection section that detects a position of a first indicator on the image;
a second detection section that detects a position of a second indicator on the image;
a storage section that includes a first storage region corresponding to the first indicator, a second storage region corresponding to the second indicator, and a third storage region common to the first indicator and the second indicator;
a first storage control section that stores a first virtual object which is drawn according to a path of the first indicator or a path of the second indicator in the first storage region;

a second storage control section that stores a second virtual object which is drawn according to the path of the first indicator or the path of the second indicator in the second storage region;

a first pasting section that pastes the first virtual object stored in the first storage region to the image according to an operation of the first indicator;

a second pasting section that pastes the second virtual object stored in the second storage region to the image according to an operation of the second indicator; and a switching section that switches operation modes of the first storage control section and the second storage control section to any one of a plurality of operation modes including a first mode and a second mode, wherein in the first mode, the first storage control section stores the first virtual object in the first storage region and the second storage control section stores the second virtual object in the second storage region, and in the second mode, the first storage control section stores the first virtual object in the third storage region and the second storage control section stores the second virtual object in the third storage region.

2. The display apparatus according to claim 1, wherein the first storage region is used as the third storage region.

3. The display apparatus according to claim 1, wherein when at least one of the first indicator and the second indicator is a user's finger, the switching section switches the operation mode to the second mode.

4. The display apparatus according to claim 1, wherein the first virtual object is a virtual object of which copy is instructed using the first indicator.

5. The display apparatus according to claim 1, wherein the first virtual object is a virtual object that is drawn using the first indictor.

6. The display apparatus according to claim 1, wherein the first virtual object is a virtual object that is selected using the first indictor.

7. A projector comprising:
a projection section that projects an image;
a first detection section that detects a position of a first indicator on the image;
a second detection section that detects a position of a second indicator on the image;
a storage section that includes a first storage region corresponding to the first indicator, a second storage region corresponding to the second indicator, and a third storage region common to the first indicator and the second indicator;
a first storage control section that stores a first virtual object which is drawn according to a path of the first indicator or a path of the second indicator in the first storage region;
a second storage control section that stores a second virtual object which is drawn according to the path of the first indicator or the path of the second indicator in the second storage region;
a first pasting section that pastes the first virtual object stored in the first storage region to the image according to an operation of the first indicator;

a second pasting section that pastes the second virtual object stored in the second storage region to the image according to an operation of the second indicator; and a switching section that switches operation modes of the first storage control section and the second storage control section to any one of a plurality of operation modes including a first mode and a second mode, wherein in the first mode, the first storage control section stores the first virtual object in the first storage region and the second storage control section stores the second virtual object in the second storage region, and in the second mode, the first storage control section stores the first virtual object in the third storage region and the second storage control section stores the second virtual object in the third storage region.

8. A display control method in a display apparatus including a display section that displays an image and a storage section that includes a first storage region corresponding to a first indicator, a second storage region corresponding to a second indicator, and a third storage region common to the first indicator and the second indicator, the method comprising:

detecting a position of the first indicator on the image;
detecting a position of the second indicator on the image;
storing a first virtual object which is drawn according to a path of the first indicator or a path of the second indicator in the first storage region;
storing a second virtual object which is drawn according to a path of the first indicator or a path of the second indicator in the second storage region;
pasting the first virtual object stored in the first storage region to the image according to an operation of the first indicator;
pasting the second virtual object stored in the second storage region to the image according to an operation of the second indicator; and
switching operation modes for storing the first virtual object and the second virtual object to any one of a plurality of operation modes including a first mode and a second mode,
wherein
in the first mode, the first virtual object is stored in the first storage region and the second virtual object is stored in the second storage region, and
in the second mode, the first virtual object is stored in the third storage region and the second virtual object is stored in the third storage region.

9. The display apparatus according to claim 1, wherein the first virtual object is drawn according to the path of the first indicator and the second virtual object is drawn according to the path of the second indicator.

10. The display apparatus according to claim 1, wherein
the first detection section detects a first wavelength of a light beam outputted from the first indicator,
the second detection section detects a second wavelength of the light beam outputted from the first indicator, and
a length of the first wavelength is different from a length of the second wavelength.

* * * * *